(12) United States Patent
Hamby et al.

(10) Patent No.: US 8,230,266 B2
(45) Date of Patent: Jul. 24, 2012

(54) SYSTEM AND METHOD FOR TRIP EVENT DATA ACQUISITION AND WIND TURBINE INCORPORATING SAME

(75) Inventors: John C. Hamby, Roanoke, VA (US); Susan J. Brown, Salem, VA (US)

(73) Assignee: General Electric Company, Schenectady, NY (US)

( * ) Notice: Subject to any disclaimer, the term of this patent is extended or adjusted under 35 U.S.C. 154(b) by 1086 days.

(21) Appl. No.: 12/132,274

(22) Filed: Jun. 3, 2008

(65) Prior Publication Data

US 2009/0299697 A1 Dec. 3, 2009

(51) Int. Cl.
*G06F 11/00* (2006.01)

(52) U.S. Cl. ......... 714/39; 714/47.1; 714/45; 702/182; 702/33

(58) Field of Classification Search .......... None
See application file for complete search history.

(56) References Cited

U.S. PATENT DOCUMENTS

| | | | |
|---|---|---|---|
| 4,862,394 A * | 8/1989 | Thompson et al. ......... 702/166 |
| 5,463,768 A | 10/1995 | Cuddihy et al. | |
| 6,336,065 B1 | 1/2002 | Gibson et al. | |
| 6,892,145 B2 | 5/2005 | Topka et al. | |
| 6,898,540 B2 | 5/2005 | Davies | |
| 6,973,396 B1 | 12/2005 | Shah et al. | |
| 7,013,203 B2 | 3/2006 | Moore et al. | |
| 7,222,048 B2 | 5/2007 | Petchenev et al. | |
| 7,289,920 B2 | 10/2007 | Suliman et al. | |
| 2004/0078723 A1 * | 4/2004 | Gross et al. ............... 714/47 |
| 2004/0264082 A1 * | 12/2004 | Suliman et al. ............ 361/62 |
| 2006/0070435 A1 * | 4/2006 | LeMieux et al. ............ 73/168 |
| 2007/0126592 A1 | 6/2007 | Littrell | |
| 2007/0140847 A1 | 6/2007 | Martinez De Lizarduy Romo et al. | |

* cited by examiner

*Primary Examiner* — Scott Baderman
*Assistant Examiner* — Jason Bryan
(74) *Attorney, Agent, or Firm* — James W. Pemrick; Ernest G. Cusick; Frank A. Landgraff

(57) ABSTRACT

A system and method is provided for acquiring operational data from a wind turbine and analyzing trip events. One or more data buffers can store operational data obtained from at least one control subsystem. A trip event detection system can be connected to the data buffers, and monitors for the occurrence of a trip event. The data stored in the data buffers can be transferred to a trip log buffer.

17 Claims, 4 Drawing Sheets

SYSTEM AND METHOD FOR TRIP EVENT DATA ACQUISITION AND WIND TURBINE INCORPORATING SAME

BACKGROUND OF THE INVENTION

This invention relates generally to wind turbines, and more particularly, to a system and method for acquiring trip event data in wind turbines.

Recently, wind turbines have received increased attention as an environmentally safe and relatively inexpensive alternative energy source with zero green house gas (GHG) emissions. With this growing interest, considerable efforts have been made to develop wind turbines that are reliable and efficient.

Generally, wind turbines use the wind to generate electricity. The wind turns one or more blades connected to a hub, where the blades and hub can comprise a rotor. The spin of the blades caused by the wind spins a shaft connected to the rotor, which connects to a generator that generates electricity. Specifically, the rotor is mounted within a housing or nacelle, which is positioned on top of a truss or tubular tower. Utility grade wind turbines (e.g., wind turbines designed to provide electrical power to a utility grid) can have large rotors (e.g., 30 or more meters in diameter). Blades on these rotors transform wind energy into a rotational torque or force that drives one or more generators, rotationally coupled to the rotor through a gearbox. The gearbox may be used to step up the inherently low rotational speed of the turbine rotor for the generator to efficiently convert mechanical energy to electrical energy, which is provided to a utility grid. Some turbines utilize generators that are directly coupled to the rotor without using a gearbox.

Power converters are used to transfer the power from the generator to a grid connection. In operation, a required level of energy will pass through a DC link of the power converter. Under certain conditions (e.g., transient power conditions), high power mismatch between the rotor and the grid connection temporally exist and voltage transients become amplified such that a DC link voltage level can increase above normal allowed or rated levels. Thus, wind turbines have to be able to absorb or deflect the excessive power level.

Pitch control subsystems are used to rotate the blades about their axial or longitudinal axis. In some known wind turbines an electronic controller is used in conjunction with a blade pitch mechanism to pitch the blades around their respective longitudinal axes to control the power output of the wind turbine. Motors can be provided to pitch the blades while the rotor is turning. The pitch control subsystem can also be used to feather the blades during storm conditions.

Wind turbine controllers can be used to monitor many operating parameters of the wind turbine, and various environmental conditions (e.g., wind speed, ambient temperature, etc.). In addition, the wind turbine controller can instruct the various wind turbine subsystems to adjust various operating modes to compensate for or react to changing environmental conditions.

It can be seen that some wind turbines comprise three subsystems, the pitch control subsystem, the power converter subsystem and the wind turbine controller subsystem. Sensor data from each of these subsystems can be helpful in determining when and why a fault or trip event occurred. To date, no single system has provided a means for obtaining and consolidating relevant data from each of the three subsystems listed above.

Accordingly, a need exists for an improved system and method for acquiring and analyzing data from multiple subsystems in a wind turbine.

BRIEF DESCRIPTION OF THE INVENTION

In an exemplary embodiment, a system is provided for acquiring operational data from a wind turbine and analyzing trip events. One or more data buffers can store operational data obtained from at least one control subsystem. A trip event detection system can be connected to the data buffers, and monitors for the occurrence of a trip event. The data stored in the data buffers can be transferred to a trip log buffer.

In another exemplary embodiment, a method is provided for acquiring operational data from a wind turbine and analyzing trip events. The method comprises the steps of: obtaining operational data from at least one control subsystem, storing operational data in one or more data buffers, monitoring the operational data for the indication of a trip event, and upon the indication of a trip event, transferring all or a subset of the operational data contained within the data buffers to a trip log buffer.

DETAILED DESCRIPTION OF THE INVENTION

Various embodiments of the present invention include a system and method for acquiring and analyzing operational data obtained from a wind turbine. Technical effects of the various embodiments include acquiring operational data from one or more subsystems of the wind turbine. Other technical effects include monitoring and analyzing the operational data to determine if a trip event occurred, when a trip event occurred and why the trip event occurred.

Figure 1:
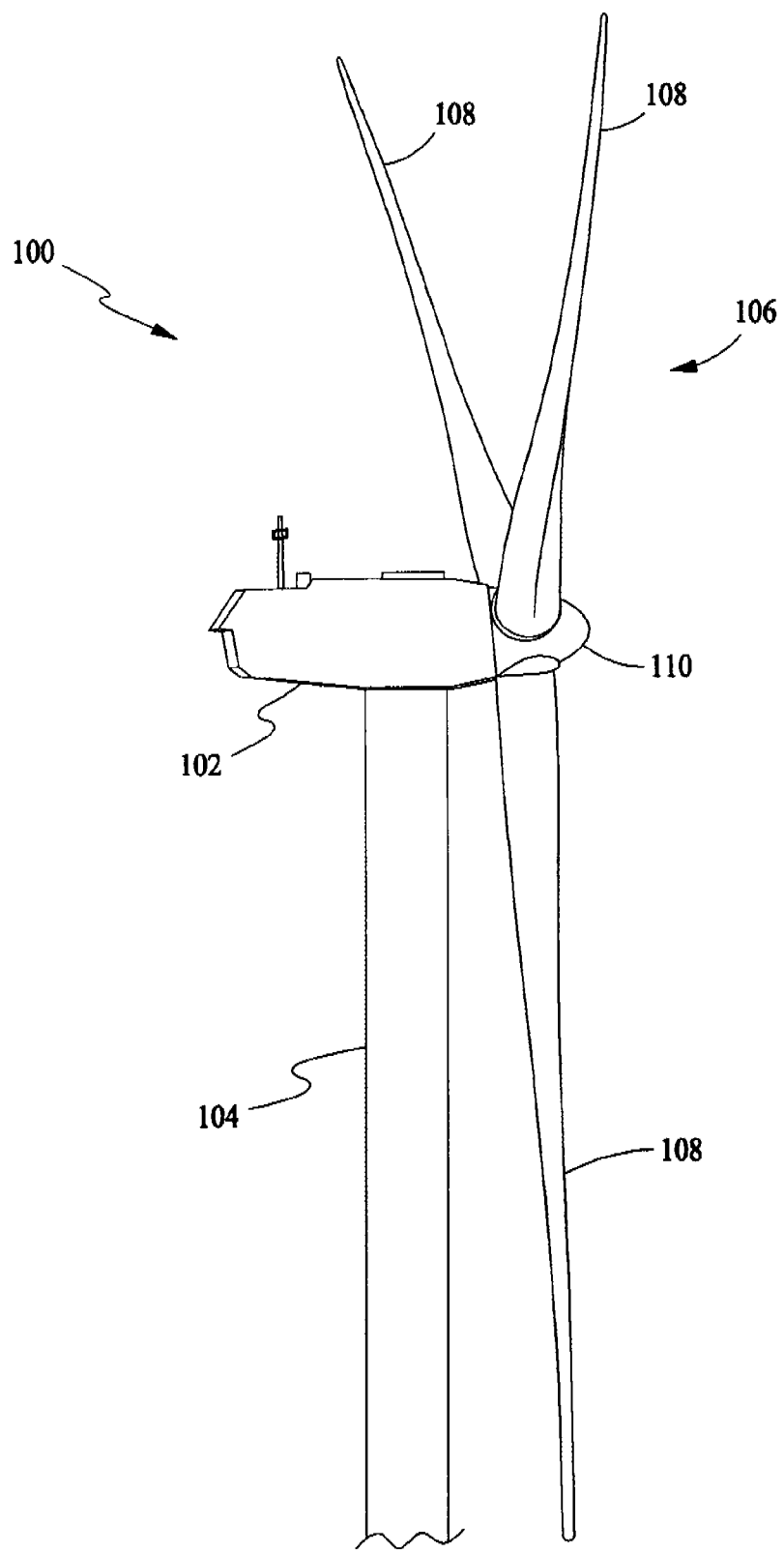
FIG. 1 is a side perspective view of a wind turbine constructed in accordance with an exemplary embodiment of the present invention.

In various embodiments and referring to FIG. 1, a wind turbine system includes one or more wind turbines 100. The wind turbines 100 generally include a nacelle 102 housing a generator (not shown in FIG. 1). The nacelle 102 can be mounted on a tower 104, only a portion of the tower 104 being shown in FIG. 1. The wind turbine 100 also includes a rotor 106 that includes a plurality of rotor blades 108 attached to a rotating hub 110. Although the wind turbine 100 illustrated in FIG. 1 includes three rotor blades 108, there are no specific limits on the number of rotor blades 108 required by various embodiments of the present invention. Thus, additional or fewer rotor blades 108 may be provided.

Figure 2:
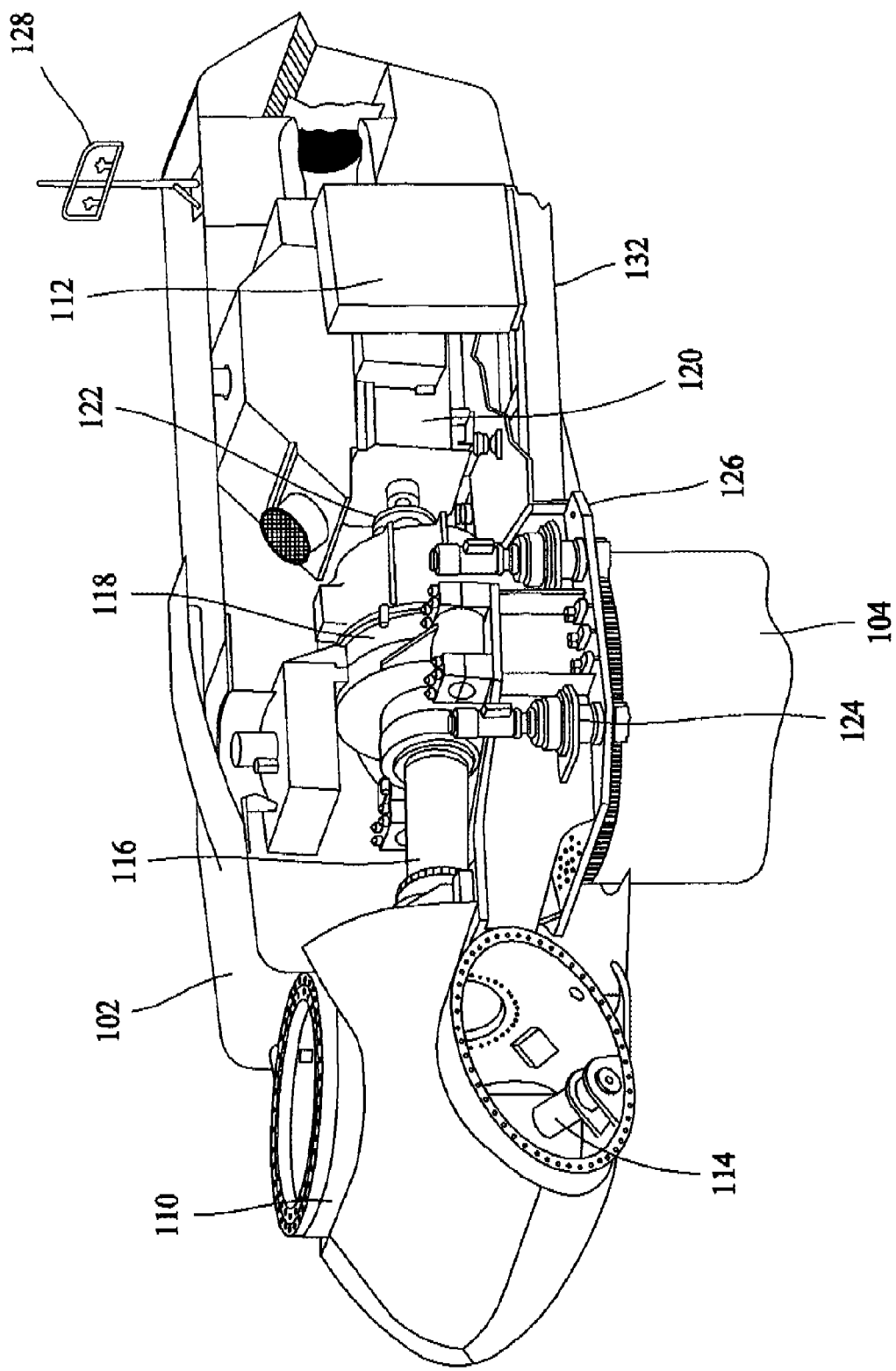
FIG. 2 is a cut-away perspective view of a nacelle of the exemplary wind turbine shown in FIG. 1.

Referring now to FIG. 2, in the various embodiments of the present invention, various components are housed in the nacelle 102 on the tower 104 of the wind turbine 100. Further, the height of the tower 104 may be selected based upon factors and conditions known in the art. In some embodiments, one or more microcontrollers within a control panel 112 form a control system (described in more detail below) used for overall system monitoring and control including pitch and speed regulation, high-speed shaft and yaw brake application, yaw and pump motor application, and power level and fault monitoring. Alternative distributed or centralized control architectures may be used in some embodiments.

In various embodiments, the control system provides control signals to a variable blade pitch drive 114 to control the pitch of blades 108 (shown in FIG. 1) that drive hub 110 as a result of wind. An electric motor with drive can be used to pitch the blades, or hydraulics could be used for pitch control of blades. The control system also provides control signals to a converter of a conversion component as described in more detail below.

In various embodiments, the hub 110 receives three blades 108, but other configurations can utilize any number of blades. In various embodiments, the pitches of the blades 108 are individually controlled by the blade pitch drive 114. The hub 110 and blades 108 together form the wind turbine rotor 106. The drive train of the wind turbine includes a main rotor shaft 116 (also referred to as a "low speed shaft") connected to the hub 110 and a gear box 118 that, in some embodiments, utilizes a dual path geometry to drive a high speed shaft enclosed within the gear box 118. The high speed shaft (not shown in FIG. 2) is used to drive a generator 120 that is supported by a main frame 132. In some embodiments, rotor torque is transmitted via a coupling 122. The generator 120 may be of any suitable type, for example and without limitation, a wound rotor induction generator, such as a doubly fed induction generator Another suitable type by way of non-limiting example is a multi-pole generator that can operate at the speed of the low speed shaft in a direct drive configuration, without requiring a gearbox.

A yaw drive 124 and a yaw deck 126 provide a yaw orientation system for the wind turbine 100. In some embodiments, the yaw orientation system is electrically operated and controlled by the control system in accordance with information received from sensors used to measure shaft flange displacement, as described below. Either alternately or in addition to the flange displacement measuring sensors, some configurations utilize a wind vane 128 or other type of anemometer to provide information for the yaw orientation system. The yaw system is mounted on a flange provided atop tower 104.

Figure 3:
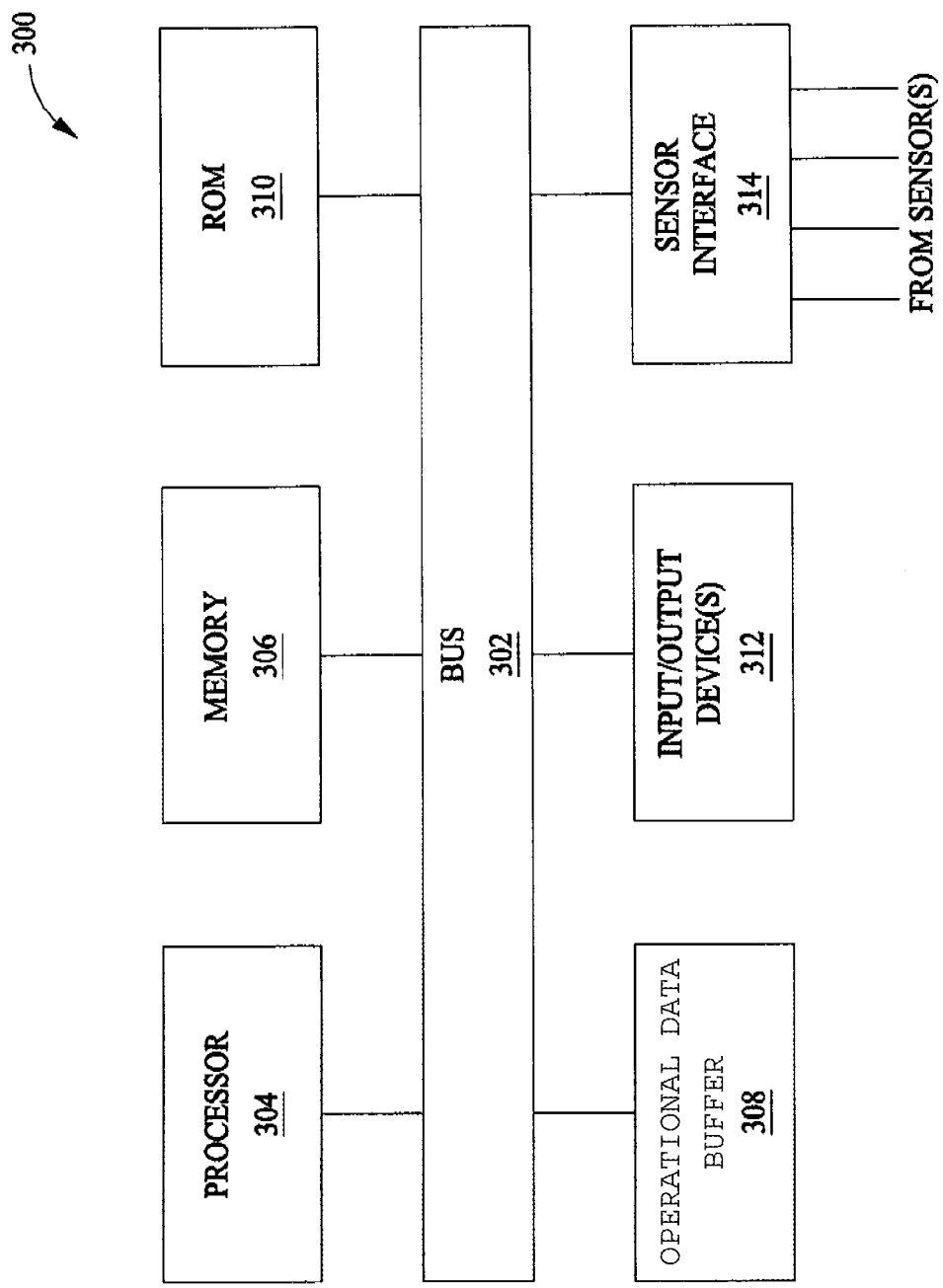
FIG. 3 is a block diagram of an exemplary configuration of a system for controlling and monitoring the wind turbine shown in FIG. 1.

In various embodiments and referring to FIG. 3, a control system 300 for the wind turbine 100 includes a bus 302 or other communication device to communicate information. Processor(s) 304 are coupled to the bus 302 to process information, including information from a variety of sensors configured to measure various operational data, such as, power levels, power fluctuations, displacements, moments, vibration levels, pitch related data, power converter data, and other operating conditions. The control system 300 further includes random access memory (RAM) 306 and operational data buffer 308. The RAM 306 is coupled to the bus 302 to store and transfer information and instructions to be executed by the processor(s) 304. The RAM 306 also can be used to store temporary variables or other intermediate information during execution of instructions by the processor(s) 304. The operational data buffer 308 can comprise one or more memory devices, and is used to store operational data received from the variety of sensors connected to the various subsystems and components of wind turbine 100. Preferably, the operational data buffer 308 is comprised of one or more nonvolatile memory devices, however, volatile memory could be used as well.

The control system 300 can also include read only memory (ROM) and or another static storage device 310, which is coupled to the bus 302 to store and provide static (i.e., non-changing) information and instructions to the processor(s) 304. Input/output device(s) 312 may be provided and can include any device known in the art to provide input data to or output data from the control system 300. For example, output devices 312 could be wireless transmitters, fiber-optic or cable based communication cables. Internet or packet based communications, or any other suitable communication method. Instructions are provided to memory from a storage device, such as magnetic disk, a read-only memory (ROM) integrated circuit, CD-ROM, DVD, via a remote connection that is either wired or wireless and that provides access to one or more electronically-accessible media, etc. In various embodiments, hard-wired circuitry can be used in place of or in combination with software instructions. Thus, execution of sequences of instructions is not limited to any specific combination of hardware circuitry and software instructions.

The sensor interface 314 is an interface that allows control system 300 to communicate with one or more sensors. The sensor interface 314 can be or can include, for example, one or more analog-to-digital converters that convert analog signals into digital signals that can be used by processor(s) 304. These sensors can sense, for example, various operational data, such as, power levels, power fluctuations, displacements, moments, vibration levels, pitch related data, power converter data, and other operating conditions within the wind turbine 100.

In one aspect of the present invention, a system and method is provided for acquiring operational data from various subsystems of wind turbine 100. In order to analyze and resolve complex problems high fidelity relevant data is needed. In wind turbine applications, it is helpful to acquire data surrounding any trip or failure events, and this data may reside before and/or after the trip event has occurred. It is also helpful to obtain data from the variety of subsystems that may comprise the wind turbine. For example, these sub-systems may include, but are not limited to, the pitch control subsystem, power converter subsystem, wind turbine controller sub-system, and yaw drive subsystem.

In aspects of the present invention, high-resolution operational data is obtained from one or more sub-systems in a continuous process. For example, data can be obtained at the frame rate or rate of the control logic sweep time, which may be about one sample per 10 ms to about 40 ms. However, the sampling rate for operational data, of any sub-system, should be at a sufficiently high rate to obtain high resolution and high quality data, and this rate may include rates above or below the 10 ms to 40 ms range described previously.

Figure 4:
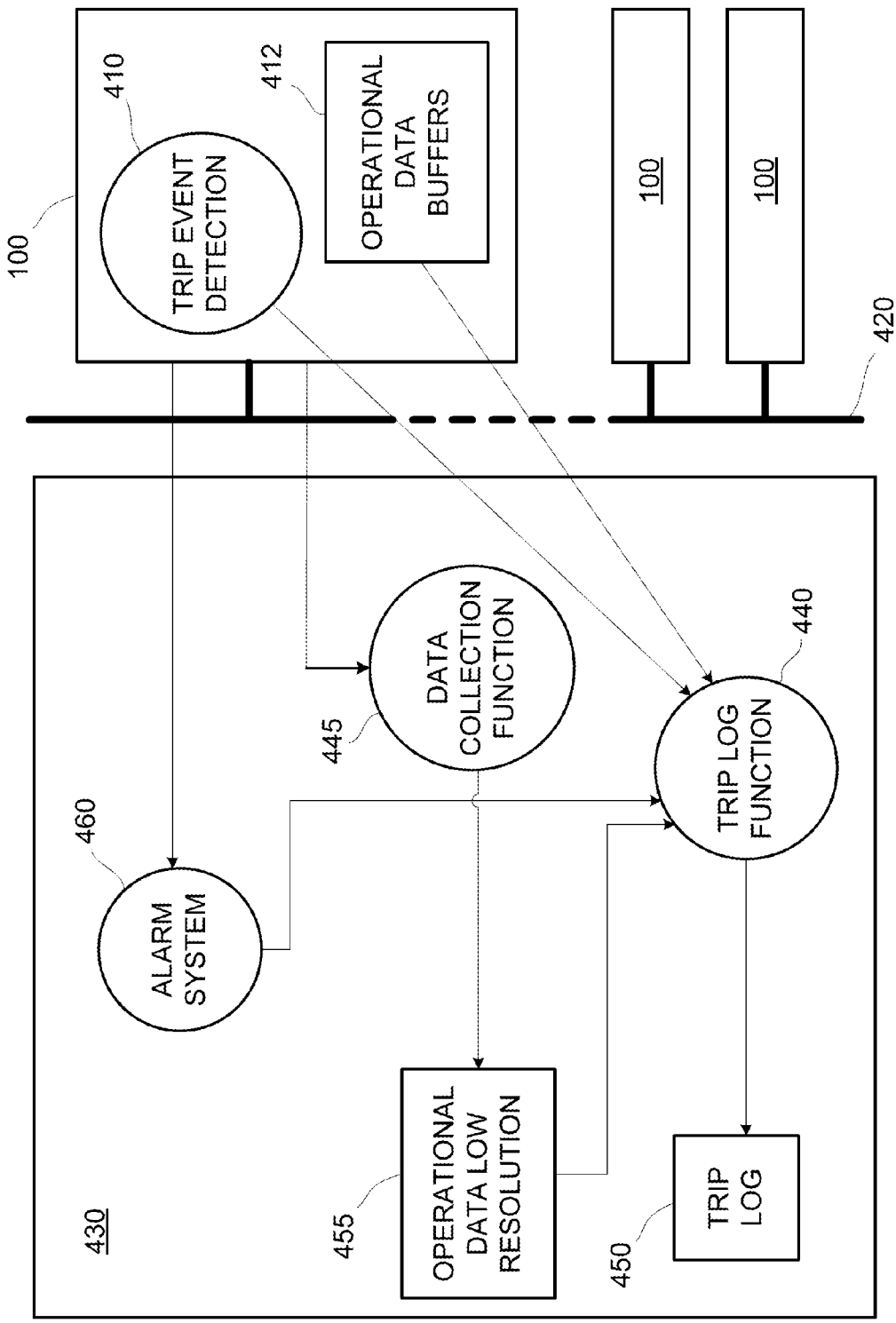
FIG. 4 is a block diagram of a system constructed in accordance with various exemplary embodiments of the present invention.

FIG. 4 illustrates one exemplary embodiment of the present invention. Multiple wind turbines 100 can comprise a wind farm, and each wind turbine 100 may be connected to a communication network 420. Network 420 can be wired (e.g., Ethernet™ a trademark of the Xerox Corporation, fiber-optic cables, telephone wires, IEEE 802.3, etc.) or wireless (e.g., WiFi® a registered trademark of the Wi-Fi Alliance, WiMAX™ a trademark of the WiMAX Forum, radio frequency, IEEE 802.11 standard, etc.). A workstation 430 may be connected to network 420 and/or to each wind turbine 420. The workstation collects and stores the operational data received from the wind turbines 100. The workstation 430 can be a local device within the wind farm, or it can be remotely located.

Each wind turbine 100 can include a control system 300 that may comprise a trip event detection function 410 and one or more operational data buffers 412. The control system may be present within each wind turbine 100 of a wind farm. The trip event detection function 410 monitors for predetermined criteria that may indicate a trip event has occurred or for indicators that a trip event may occur. Operational data from one or more sub-systems of wind turbine 100 are stored within operational data buffers 412. As stated previously, the operational data buffers can comprise one or more storage devices and are preferably non-volatile storage media (e.g., flash memory, optical or magnetic storage media, etc.).

Operational data can be acquired at a high resolution (e.g. one sample every 10 ms to 40 ms) from a variety of sensors in multiple sub-systems of wind turbine 100. Trip event detection module 410 monitors for predetermined criteria that may indicate a trip event. If a trip event has occurred, the data stored within operational data buffers 412 can be transferred to the workstation 430. In one embodiment, data before and after the trip event can be stored and transferred to workstation 430. In other embodiments, data up to and/or prior to the trip event may be transferred to workstation 430. For analysis of the trip event, the resolution of data sampling can vary based on how far in time the data is from the event. In some aspects according to the present invention, the data may be grouped in varying data resolutions based on the time relative to the trip event. For example, data after the trip event may be sent to workstation 430 at a rate of one sample per one second. This post trip data may comprise an interval of one to thirty minutes or more after the trip event.

On the occurrence of a trip event the lower resolution data can be re-sampled at different lower resolution sample rates. Pre-trip data may be grouped into about four or more time periods. However, pre-trip data could also be grouped into less than four time periods depending on the application. Data which is prior to the trip event (i.e., pre-trip) by 20 minutes or less may be re-sampled at a one sample per one second rate. Data which is prior to the trip event by about 20 minutes to about 60 minutes may be re-sampled at a one sample per ten second rate. Data which is prior to the trip event by about one hour to about five hours may be re-sampled at a one sample per one minute rate. Data which is prior to the trip event by about five hours to about 24 hours may be re-sampled at a one sample per ten minute rate. In alternative embodiments, the data may be re-sampled at varying resolutions based on predetermined time intervals. Tables 1 and 2 illustrate two examples of the data resolutions that can be assigned to time periods surrounding a trip event.

TABLE 1

|  | Post-Trip Data | | Pre-Trip Data | | |
| --- | --- | --- | --- | --- | --- |
| Time From Trip Event | 0 to +30 min. | 0 to −20 min. | −20 min. to −60 min. | −1 hour to −5 hours | −5 hours to −24 hours |
| Sample Rate | 1 sample per sec. | 1 sample per sec. | 1 sample per 10 sec. | 1 sample per 60 sec. | 1 sample per 10 min. |

Table 1 illustrates one example of varying resolution data capture and/or storage. A "+" in the table indicates a post-trip event time period (i.e., after the trip event), and a "−" indicates a pre-trip time period (i.e., before the trip event). However, any range and number of time periods and data resolution/sample rates can be employed as required by the specific application. The ranges specified above are only examples of many suitable time periods and sample rates.

Operational data can be transferred from a wind turbine 100 to workstation 430 before, during or after a trip event. A trip log function 440 and the data collection function 445 comprise a data collection system and receive operational data from wind turbines 100. Data at varying resolutions (e.g., varying sample rates based on various time periods) can be stored within trip log 450. Typically, the trip log 450 stores data that is within 24 hours of the trip event. Longer term data, data which may be greater than 24 hours, may be stored in operational data low resolution data store 455. Data may be retained within low-resolution data store 455 at any suitable sampling rate, but is normally at the fastest of the lower resolution data stored within trip log 450. For example, data may be stored within trip log 450 according to the time periods and sampling rates identified in Table 1. Data stored in the operational data low-resolution data store 455 could be retained at a rate of one sample per second. In one embodiment data within 24 to 48 hours or more from the current time can be stored within data store 455, and in other embodiments data within 1 day to 1 week or more may be stored within data store 455. Only a few examples have been given, but any suitable data resolution and/or time period(s) may be implemented as dictated by the specific application.

TABLE 2

|  | Post-Trip Data | Pre-Trip Data | | | | |
| --- | --- | --- | --- | --- | --- | --- |
| Time From Trip Event | 0 to +30 sec. | 0 to −1 min. | −1 to −20 min. | −20 min. to −60 min. | −1 hour to −5 hours | −5 hours to −24 hours |
| Sample Rate | 1 sample per 40 ms | 1 sample per 40 ms | 1 sample per sec. | 1 sample per 10 sec. | 1 sample per 60 sec. | 1 sample per 10 min. |
| Data Source | Operational Data Buffers | Operational Data Buffers | Operational Data Low Resolution | Operational Data Low Resolution | Operational Data Low Resolution | Operational Data Low Resolution |

Table 2 illustrates another example of sampling rates and time periods that may be used in various aspects of the present invention. In this example, the post trip data is grouped into one time period, and the pre-trip data is grouped into five time periods. The sampling rates for each time period are shown in Table 2. The data source is also indicated, with the operational data buffers 308, 412 supplying the post-trip data and the pre-trip data less than about 1 minute from the trip. The operational data low resolution data store 455 can supply pre-trip data that is more than one minute prior to the trip event. The ranges specified above are only examples of many suitable time periods and sample rates. However, any range and number of time periods and data resolution/sample rates can be employed as required by the specific application.

To provide a better picture of the data surrounding the trip event, alarm events can be included in the trip log. An alarm system 460 can be used in conjunction with the trip log function. Wind turbines 100 can be configured to issue alarms if predetermined conditions occur or specific operating ranges are exceeded. The wind turbine alarms can be received by alarm system 460 within workstation 430, and may trigger the data capture and/or transfer process.

In other embodiments, the control device may be comprised of trip event detection function 410 and operational data buffer(s) 412, and may reside within each wind turbine 100. The application code in the control device determines the conditions that constitute a trip and monitors for those conditions. The data buffers 412 can collect data for the specified variables at high resolution (e.g., the frame rate, rate at which the controller is running, or the rate of the control logic sweep time, generally between about 10 to 40 milliseconds). The number of data buffers used is configurable and is determined by the application. In some embodiments, a first portion of the data buffers could be assigned to specific faults (e.g., pitch related trip events), and a second portion of the data buffers could be assigned to a different type of trip event (e.g., power converter faults.

The data buffers 412 may take as input a trigger, number of samples per trigger, number of samples post trigger and the variables (data points) to be collected. The block outputs a status signal that indicates the state of the capture block. When the controller is in normal operation (i.e., no trip event) the capture block will have a status of waiting for trigger and be collecting data for the pre-trigger samples. When a trip event occurs the block status changes to capturing and data is collected for the number of post-trigger samples. When all the samples have been taken the block status changes to complete.

The control device may also be connected to the network 420 and is capable of sending and receiving data across the network. In other embodiments, an ad hoc network may be created or point-to-point data communication can be implemented. The variables being collected in the data buffers 412 is part of the data that the controller sends across the network.

The workstation 430 may be a personal computer or laptop computer running the Microsoft Windows operating system. However, any suitable processing means and operating system can be used. The workstation can be loaded with a software product that may contain several sub-systems. One of those sub-systems can be a data collection sub-system (elements 440 and 445). When the data collection is configured for a trip log it can have multiple functions.

A first function can be to collect and store the data values of the variables defined in the trip. These are the same variables being collected in the data buffers 412. The difference is that the data collection gets the values from the data the control device sends across the network. The data collection can store this data at a one second rate (or multiple rates or other rates) into files or a database located in or accessible to the workstation 430. When the system is not in a trip condition what we have is data being collected on the workstation 430 by the data collection sub-system (440 and 445) and the data for the same variables being collected in the control device in the data buffers 412.

A second function of the data collection can be to monitor the status values on the data buffers 412. When these buffers go to a complete state then the data collection function 445 knows a trip event has occurred and that the data from the data buffers 412 is available to be transferred to the workstation 430.

When a trip event occurs the data collection system (440 and 445) can create a file (e.g., trip log 450) that contains re-sampled data from the operational data low resolution data store 455, and data obtained from the operational data buffers 412. In general, the data resolution can be higher near the trip event and progressively becomes lower as time progresses further from the trip event. Another piece of information that can be written to the trip log is the alarms/events that occurred around the time of the trip event. This information can be obtained from the alarm system 460 that is part of the software in the workstation 430. The alarm system 460 obtains the alarms from the control device and keeps a historical copy.

The data file obtained by the workstation 430 can be viewed using a variety of software products (e.g., a Trender*, which is part of the ToolboxST* and/or WorkstationST* software products, where a "*" denotes Trademarks of the General Electric Company). The WorkstationST* software product can also provide the ability to convert the file into a Comma Separated Variable (.csv) file which may then be opened by other third party products, such as common spreadsheet programs, for root cause analysis. Another advantage, is that all the data can be contained in one file and the single file can be transferred from a remote site for root cause analysis.

In one example, the workstation 430 could be laptop based and portable. This would enable the workstation to be transported from wind farm to wind farm. The workstation 430 could also be located at a remote site and connected to each wind turbine over any suitable communication link (e.g., network 420 or the Internet). The workstation could also be a local device housed within the wind farm, either within a specific tower or within an electronics center.

Operational data can be transferred from the wind turbine 100 or workstation 430 at one or more sample rates to a data file, database or trip log before, during or after a trip event.

While the invention has been described in terms of various specific embodiments, those skilled in the art will recognize that the various embodiments of the invention can be practiced with modification within the spirit and scope of the claims.

What is claimed is:

1. A system for acquiring operational data from a wind turbine and analyzing trip events, said system comprising:
    one or more data buffers for storing operational data obtained from at least one control subsystem;
    a trip event detection system connected to said one or more data buffers, said trip event detection system employed to monitor for the occurrence of a trip event;
    wherein, upon occurrence of a trip event the operational data is resampled at various re-sampling rates for various time periods relative to the trip event, and the resampled data is transferred to a trip log buffer, and wherein the trip log buffer is, at least one of, locally or remotely located with respect to the wind turbine.

2. The system according to claim 1, wherein said one or more data buffers further comprise:
    a pitch control buffer for storing operational data obtained from a pitch control subsystem;
    a power converter buffer for storing operational data obtained from a power converter subsystem; and
    a wind turbine controller buffer for storing operational data obtained from a wind turbine controller.

3. The system according to claim 1, wherein the operational data is retained in said one or more data buffers at a resolution of one sample per about 10 milliseconds to one sample per about 40 milliseconds.

4. The system according to claim 1, wherein the operational data is resampled at a one sample per about one second rate for a time period corresponding to about 48 hours.

5. The system according to claim 1, further comprising:
    transferring operational data less than about 20 minutes prior to the trip event at a re-sampled one sample per second rate;

transferring data from about 20 minutes prior to the trip event to about 60 minutes prior to the trip event at a re-sampled one sample per 10 second rate;

transferring data from about 60 minutes prior to the trip event to about 5 hours prior to the trip event at a re-sampled one sample per 60 second rate;

transferring data from about 5 hours prior to the trip event to about 24 hours prior to the trip event at a re-sampled one sample per 10 minute rate.

6. The system according to claim 1, wherein historical alarm data is transferred to said trip log buffer.

7. The system according to claim 1, wherein operational data prior to the trip event by about 48 hours is, at least one of, deleted or archived to a storage device.

8. The system according to claim 1, wherein a root cause analysis is performed on the operational data to determine a trip event cause.

9. The system according to claim 1, wherein said one or more data buffers store data corresponding to at least a 24 hour time period.

10. A method for acquiring operational data from a wind turbine and analyzing trip events, said method comprising the steps of:

obtaining operational data from at least one control subsystem;

storing said operational data in one or more data buffers;

monitoring said operational data for the indication of a trip event;

wherein, upon the indication of the trip event, re-sampling the operational data at various re-sampling rates for various time periods relative to the trip event; and transferring the re-sampled operational data to a trip log buffer, and wherein said trip log buffer is, at least one of, locally or remotely located with respect to said wind turbine.

11. The method according to claim 10, wherein said one or more data buffers store data corresponding to at least a 24 hour time period.

12. The method according to claim 10, wherein said storing step comprises:

storing operational data at one sample per about 10 milliseconds to one sample per about 40 milliseconds.

13. The method according to claim 10, wherein:

pitch control operational data is obtained from a control system;

power converter operational data is obtained from said control system; and wind turbine controller operational data is obtained from said control system, and;

wherein said storing step further comprises storing said operational data in a database at a one sample per about one second rate.

14. The method according to claim 10, wherein said transferring the re-sampled operational data to a trip log buffer step further comprises:

storing data in said trip log buffer at a one sample per about 40 milliseconds resampling rate for operational data after a trip event;

storing data in said trip log buffer at a one sample per about 40 milliseconds resampling rate for operational data zero seconds to about 60 seconds prior to a trip event;

storing data in said trip log buffer at a one sample per one second resampling rate for operational data about one minute to about 20 minutes prior to a trip event;

storing data in said trip log buffer at a one sample per 10 seconds resampling rate for operational data about 20 minutes to about 60 minutes prior to a trip event;

storing data in said trip log buffer at a one sample per 60 seconds resampling rate for operational data about 60 minutes to about 5 hours prior to a trip event;

storing data in said trip log buffer at a one sample per 10 minutes resampling rate for operational data about 5 hours to about 24 hours prior to a trip event.

15. The method according to claim 10, wherein all or a subset of historical alarms and events from an alarm system is transferred to said trip log buffer.

16. The method according to claim 10, wherein a root cause analysis is performed on the operational data to determine the trip event cause.

17. The method according to claim 10, wherein operational data older than about 48 hours is, at least one of, deleted or archived to a storage device.

* * * * *